E. WITZBERGER.
SNAP STOVE BOLT.
APPLICATION FILED NOV. 12, 1921.

1,426,237.

Patented Aug. 15, 1922.

E. Witzberger
INVENTOR

BY Victor J. Evans
ATTORNEY

UNITED STATES PATENT OFFICE.

ETIENNE WITZBERGER, OF CARNEGIE, PENNSYLVANIA, ASSIGNOR TO WITZBERGER HEATING APPLIANCES COMPANY, A CORPORATION OF PENNSYLVANIA.

SNAP STOVE BOLT.

1,426,237.  Specification of Letters Patent.  Patented Aug. 15, 1922.

Application filed November 12, 1921. Serial No. 514,685.

*To all whom it may concern:*

Be it known that I, ETIENNE WITZBERGER, a citizen of the United States, residing at Glendale, Carnegie, in the county of Allegheny and State of Pennsylvania, have invented new and useful Improvements in Snap Stove Bolts, of which the following is a specification.

This invention relates to securing devices, and more particularly to what I term a snap stove bolt.

One of the main objects of the invention is to provide a bolt of simple construction and operation by means of which overlapping plates used in stove construction may be quickly and easily secured together. A further object is to provide a bolt which may be readily applied to parts of the stove structure where it would be very inconvenient or impossible to use the ordinary stove bolt. Another object is to provide a bolt of the character stated of simple and efficient construction which may be readily produced at small cost. Further objects will appear from the detailed description.

In the drawings:—

Figure 3:
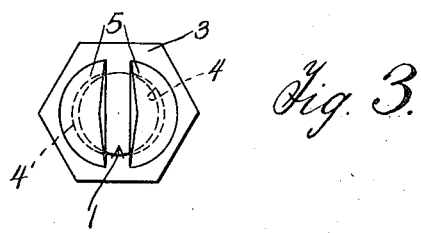
Figure 3 is an inner end view of the bolt.

In constructing the bolt, which is preferably made of spring steel or any other suitable material, I provide a cylindrical body 1 which has its end portion threaded at 2 to receive a securing nut 3. Body 1 is split for the greater portion of its length to provide two diverging arms 4. Each of these arms is provided at its outer end with a head 5 forming a shoulder 6. In using the bolt I provide two overlapping plates *a* and *b* which it is desired to secure together with alined openings *c* and *c'*, these openings being of slightly greater diameter than the body of the bolt. After openings *c* and *c'* have been moved into substantial alinement the bolt is inserted through these openings, arms 4 being forced toward each other during insertion of the bolt and springing apart when the heads 5 are positioned adjacent to the inner face of plate *b*. As will be noted more clearly from Figure 3, heads 5 are of substantially semi-conical shape so that these heads facilitate ready insertion of the bolt through the openings in plates *a* and *b*, and also serve to bring these openings into alinement with each other during insertion of the bolt. After this has been done nut 3 is turned tightly upon the threaded portion 2 of the bolt, this nut co-acting with shoulder 6 to effectually clamp together plates *a* and *b*.

Figure 1:
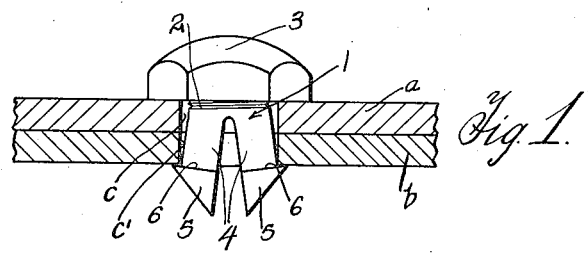
Figure 1 is a side view of the bolt as applied.
Figure 2:
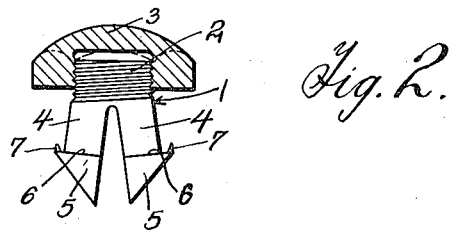
Figure 2 is a side view, partly in section, of the modified form.

In the modified form illustrated in Figure 2 I have provided each shoulder 6 with a prong 7 which is directed toward nut 3. These studs serve to bite into inner plate *b* when nut 3 is turned tightly upon the bolt so as to effectually eliminate any possibility of turning of the bolt when tightening up the nut.

What I claim is:—

1. In a device of the character described, a body threaded to receive a nut on one end and provided at its other end with outwardly diverging resilient arms, said arms being provided at their outer ends with enlarged heads forming shoulders projecting beyond the arms for engagement with the inner surface of a sheet of material through which the bolt is inserted.

2. In a device of the character described, a body threaded at one end for reception of a securing nut, and outwardly diverging resilient arms extending from the other end of the body and each provided at its outer end with an outwardly projecting shoulder extending about the arms and with a prong extending from said shoulder in the direction of the threaded end of said body.

3. In combination with two overlapping plates provided with alined openings, a member including two resilient diverging arms each provided on its outer end with an enlarged head forming shoulders for engagement with the edge portion of one of the plates, about the opening therein, said arms being inserted through said alined openings, a threaded element extending from the other ends of the arms, and a nut threaded upon said threaded element, said nut and the shoulders co-acting to clamp between them the plates.

In testimony whereof I affix my signature.

ETIENNE WITZBERGER.